(12) United States Patent
Morrow (10) Patent No.: US 7,460,577 B2
(45) Date of Patent: Dec. 2, 2008

(54) RF LASER

(75) Inventor: Clifford Morrow, North Kingston, RI (US)

(73) Assignee: Iradion Laser, Inc., North Smithfield, RI (US)

( * ) Notice: Subject to any disclaimer, the term of this patent is extended or adjusted under 35 U.S.C. 154(b) by 402 days.

(21) Appl. No.: 11/324,961

(22) Filed: Jan. 3, 2006

(65) Prior Publication Data

US 2008/0101430 A1 May 1, 2008

Related U.S. Application Data

(63) Continuation-in-part of application No. 10/100,194, filed on Mar. 18, 2002, now abandoned.

(60) Provisional application No. 60/715,084, filed on Sep. 8, 2005, provisional application No. 60/350,638, filed on Jan. 23, 2002, provisional application No. 60/277,025, filed on Mar. 19, 2001.

(51) Int. Cl.
*H01S 3/223* (2006.01)

(52) U.S. Cl. .............................. 372/58; 372/61; 372/87; 372/37; 372/64

(58) Field of Classification Search .................. 372/58, 372/61, 87, 37, 64
See application file for complete search history.

(56) References Cited

OTHER PUBLICATIONS

P.C. Conder, J.R. Redding and R.M. Jenkins,"Novel Technology and Performance of a High-Power CO2 Waveguide Laser", Infrared Phys. vol. 25, No. 1/2, pp. 61-67, 1985.*

* cited by examiner

*Primary Examiner*—Minsun Harvey
*Assistant Examiner*—Patrick Stafford
(74) *Attorney, Agent, or Firm*—Barnes & Thornburg LLC (57) ABSTRACT

An RF excited gas laser including an offset V-shaped laser cavity. The laser includes a first and second ceramic body portions with the laser cavity at least partially defined by the ceramic body portions. At least one internal gas reservoir is also at least partially defined by the first and second body portions, with the internal gas reservoir being in gas communication with laser cavity by way of at least one gas communication slot. The RF laser further includes at least two electrode slots formed in the exterior of the ceramic body portions and an electrode at least partially received in the electrode slots.

21 Claims, 10 Drawing Sheets

＃ RF LASER

CROSS-REFERENCE TO RELATED APPLICATIONS

This application claims the benefit of U.S. provisional patent application Ser. No. 60/715,084, filed Sep. 8, 2005, and is a continuation-in-part of U.S. patent application Ser. No. 10/100,194, filed on Mar. 18, 2002, now abandoned which claims the benefit of U.S. provisional patent application Ser. No. 60/277,025, filed Mar. 19, 2001 and claims the benefit of U.S. provisional patent application Ser. No. 60/350,638, filed Jan. 23, 2002, the entire disclosures of all of which applications are incorporated herein by reference.

FIELD

The present disclosure is generally directed at an RF excited laser, and more particularly pertains to RF excited ceramic lasers.

BACKGROUND

Carbon dioxide lasers are used in many commercial and military applications, including engraving, cutting, etc. Carbon dioxide lasers produce laser light in the infrared spectrum at around 10.6 μm wavelength. One variety of carbon dioxide lasers employ a ceramic bore which acts as an optical waveguide and/or a free space propagation path for the laser radiation and also confines the electrical discharge for exciting the carbon dioxide gas. Consistent with such a design, the bore must be provided as a very straight and accurately formed hole in the ceramic material with the outside of the ceramic body having electrical contacts and the ends of the bore being positioned adjacent to mirrors. The ceramic body may often be disposed in a metal enclosure, which may provide the necessary vacuum integrity, mirror supports, and seals.

The bore in the ceramic laser may be formed by drilling a hole in a unitary ceramic body, or may be formed as a groove in one ceramic body to which a covering ceramic body may be bonded using glazing or thermo-diffusion bonding techniques. In either instance, because the beam of light interacts to various degrees, depending on bore size, with the walls of the bore, the straightness and optical finish of the bore are critical to the performance of the laser. Care is, therefore, necessary in preparing the optical bore to ensure that there is not seepage or leakage of fritting material into the optical bore.

Mirrors, seals, etc. may be attached to the ceramic body to complete the laser. Features, such as mirrors, etc., which are provided in connection with openings in communication with the laser bore must provide a gas tight seal. A gas tight seal may be provided by various methods to make a seal to the ceramic. The mirror, or other feature, may be attached to the ceramic body by brazing or welding to a metallized ceramic surface, glass fritting directly to the ceramic, etc., to assure a gas tight seal.

BRIEF DESCRIPTION OF THE DRAWINGS

Features and advantages of the present invention are set forth by way of description of embodiments consistent therewith, which description should be considered in combination with the accompanying drawings, wherein.

DESCRIPTION

Figure 1:
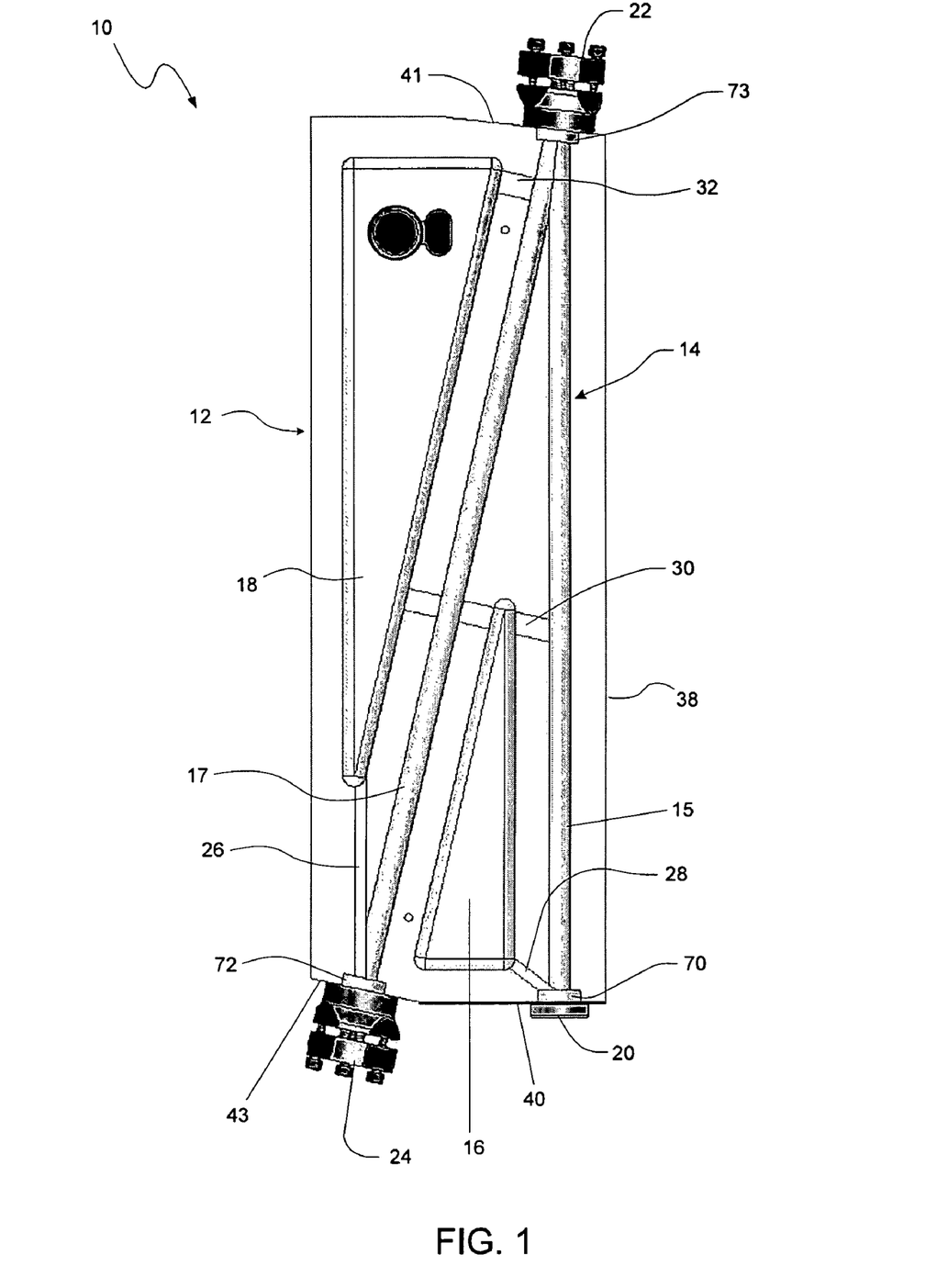
FIG. 1 is a schematic illustration of an embodiment of a laser consistent with the present disclosure.

Referring to FIG. 1, an embodiment of an RF laser 10 is schematically depicted. The laser 10 may generally include a body 12 having a laser cavity 14 at least partially defined within the body 12. The laser 10 may further include at least one internal gas reservoir 16, 18 also at least partially defined within the body 12. The laser 10 may further include a plurality of mirrors 20, 22, 24, with at least one mirror 20 being configured as an output coupler. Gas communication between the laser cavity 14 and the internal gas reservoirs 16, 18 may be provided by one or more gas communication slot 26, 28, 30, 32.

Figure 2:
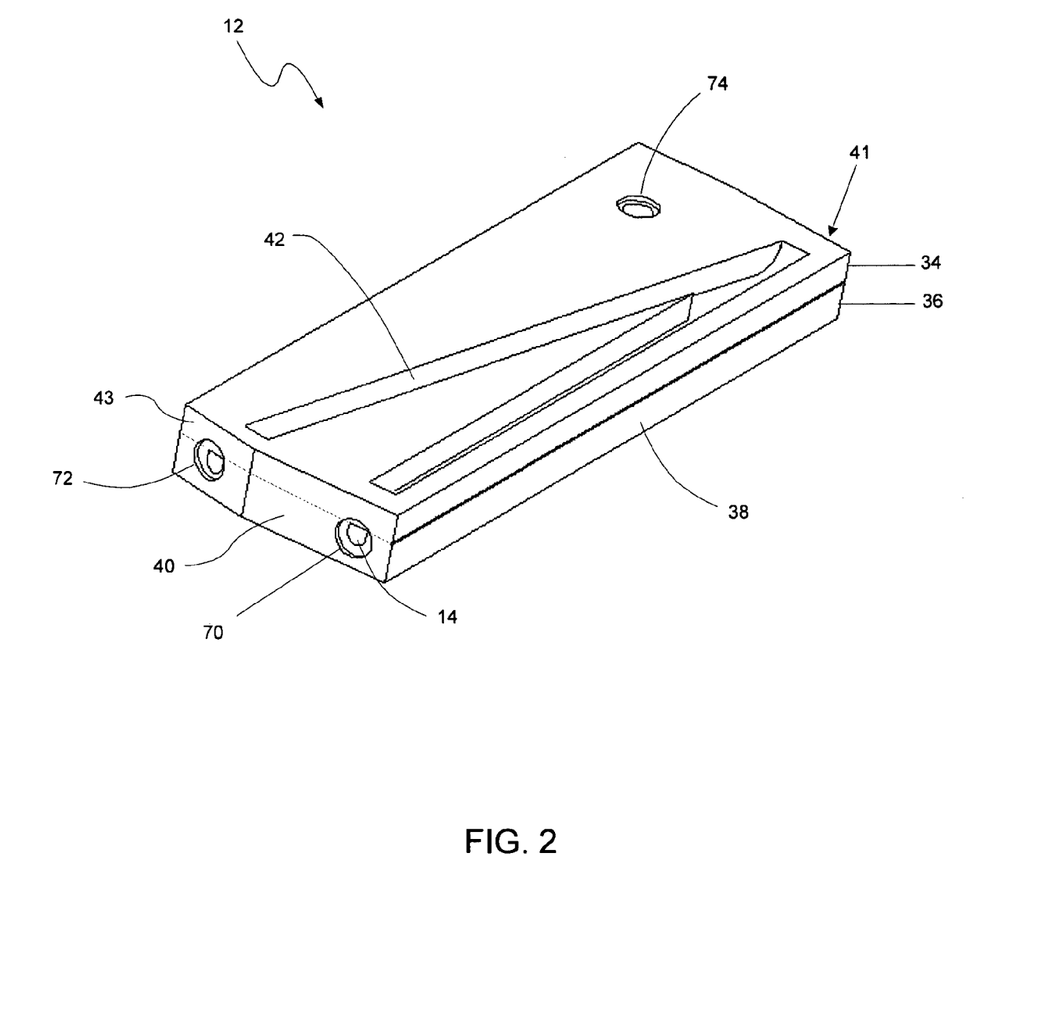
FIG. 2 is a perspective view of an embodiment of a laser body consistent with the present disclosure.

With additional reference to FIG. 2, the laser body 12 may include at least two body components, such as an upper body portion 34 and a lower body portion 36. The upper and lower body portions 34, 36 may be formed from a ceramic material, e.g., an alumina ceramic, although other ceramic materials which do not react with gas species generated in RF discharge may also be employed in connection with various different embodiments. In various alternative embodiments, the laser body may include more than two body components. For example, the laser body may include a laminate structure of three or more layers, etc. The upper and lower body portion 34, 36 may be sealed together by a glass frit layer between the two body portions 34, 36. One example of a suitable glass frit may be provided in the form of a broad tape which may be cut and applied between the body portions, e.g., by applying the tape to one body portion and assembling the other body portion onto the tape. The tape and body portions may be fired, e.g., under a clamping force, to seal the two body portions together. One suitable tape material is produced by Vitta Corporation. Other methods may also be used for sealing the body components together, such as diffusion bonding, etc.

Ceramic materials of varying purity may suitably be employed for producing the laser body 12. For example, for an RF pumped laser operating at a frequency of around 40 MHz, the frequency may be low enough that loss factor will be low even if some impurities, e.g., sodium, are present. Additionally, in connection with an embodiment utilizing a free space laser cavity, the lesser interaction between the laser and cavity wall, as compared to a waveguide laser, may make the optical dielectric properties of the ceramic less important than for a waveguide laser. In one embodiment, a ceramic material having a purity in the range of between about 94% to about 99.8% may be suitable. In other embodiments, lower or higher purity ranges may also be employed.

As shown, the laser cavity 14 may be a folded laser cavity. In one embodiment, the laser cavity may be provided having a V-shape, including a first and second generally linear optical path 15, 17. In the illustrated embodiment, the laser cavity 14, may have an offset V-shape, in which the first optical path 15 may be arranged generally parallel to one side 38 of the body 12. The second optical path 17 may extend at an angle to the first optical path 20, for example extending generally diagonally across the body 12. In various alternative embodiments the laser cavity may be provided having different shapes. For example, an embodiment of a laser may include a Z-shaped laser cavity, etc.

According to one aspect, the parallel arrangement of the first optical path 15 relative to one side 38 of the body may orient a beam emitted from the laser cavity 14 along the first optical path 15 to be similarly oriented parallel to the side 38 of the body 12. When the first optical path 15 is provided parallel to the side 38 of the body 12, the output face 40 of the body 12 may be prepared by grinding the output face 40 at a right angle relative to the side 38 of the body 12. That is, grinding of the output face 40 may be carried out with reference to the side 38 of the body 12 rather than by reference to the first optical path 15. This may facilitate accurate manufacture of the laser 10 allowing the output coupler mirror 20 to be directly bonded to the ceramic body 12. Directly bonding the output coupler 20 to the ceramic body 12 may reduce the cost of the laser 10. According to other embodiments, the output coupler may be coupled to the body via a mirror mount, such as an adjustable mirror mount. In one such embodiment, the adjustable mirror mount may accommodate inaccuracies between the plane of the output face and the first optical path.

The laser 10 may be provided as a waveguide laser or a free space laser, as determined by the Fresnel number. The Fresnel number of a laser may generally be given by the formula:

$$F = \frac{A^2}{L\lambda_O}$$

in which A is the beam radius or ½ bore dimension, L is the length of the cavity, and $\lambda_O$ is the free space wavelength of the laser. A Fresnel number less than about 0.5 may define a true waveguide laser cavity in which the straightness and optical bore wall finish of the laser cavity is critical to the ultimate performance of the laser. A Fresnel number greater than about 10 may generally define a true free space laser in which there may be little or no interaction between the beam and the bore wall. The finish and straightness of the optical bore may be less important to the ultimate performance of the laser. Fresnel numbers between about 0.5 and 10 describe a Pseudo-free space optical cavity of varying degrees of interaction between the beam and the bore wall.

Figure 3:
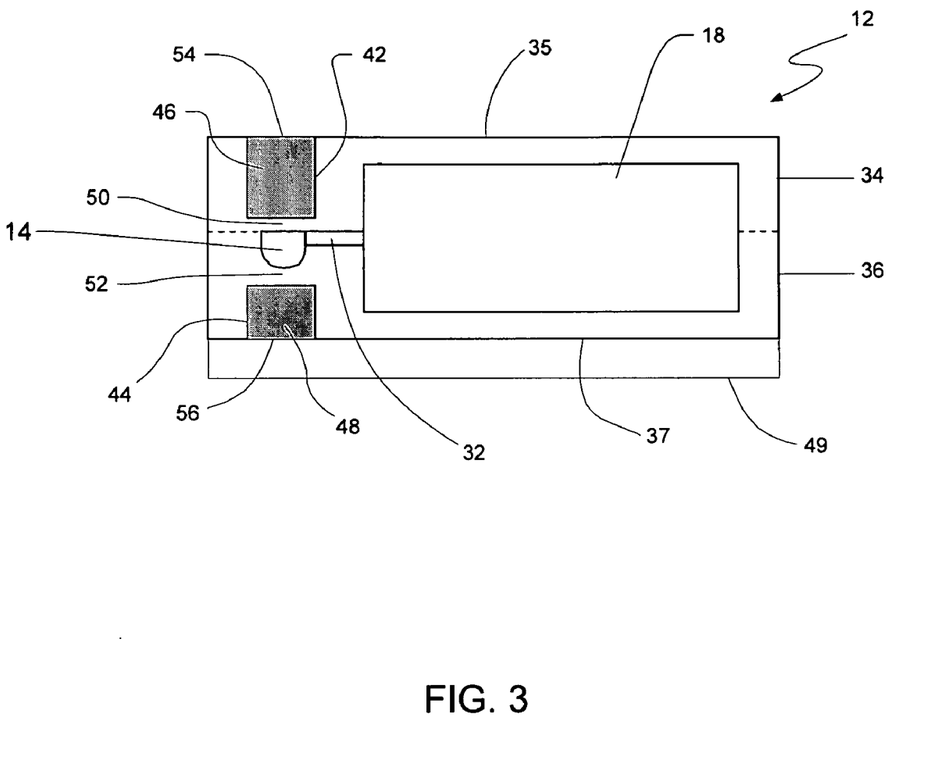
FIG. 3 is a cross-sectional view of an embodiment of a laser consistent with the present disclosure.
Figure 4:
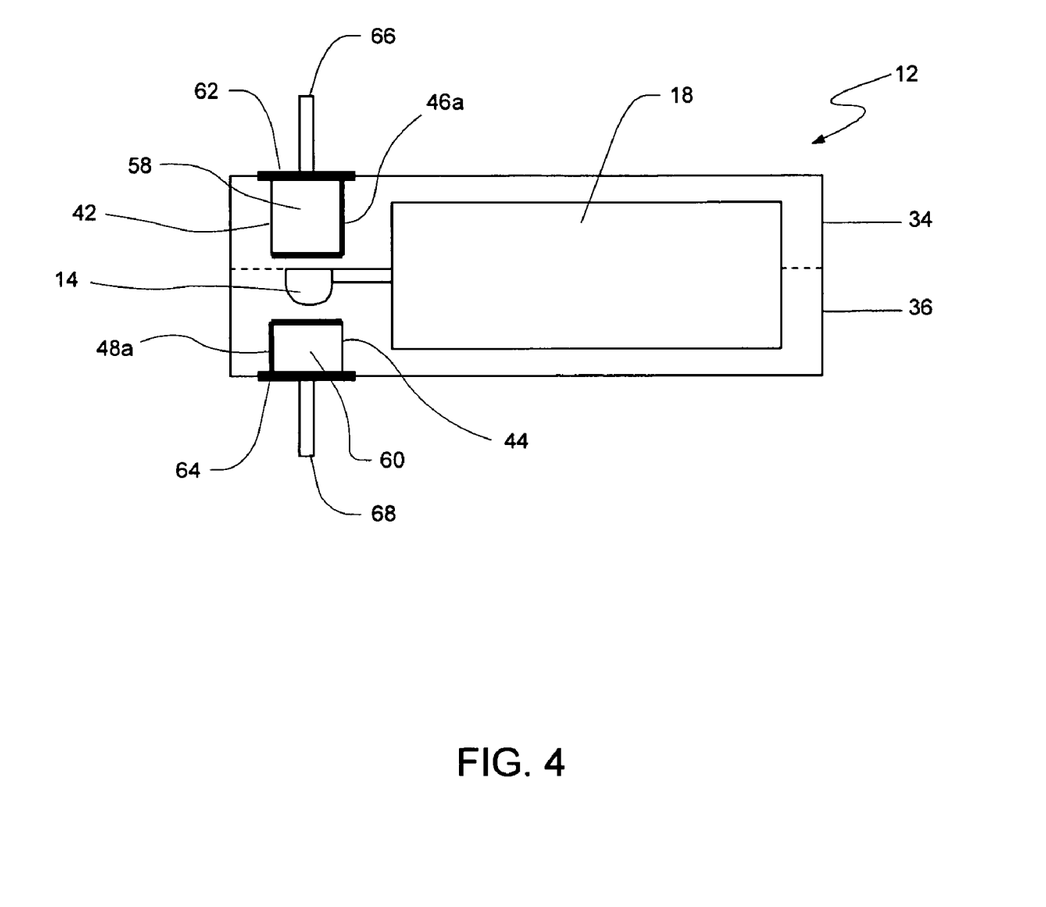
FIG. 4 is a cross-sectional view of another embodiment of a laser consistent with the present disclosure.

Consistent with one embodiment the laser may have a Fresnel number greater than about 0.5. In a further embodiment, the laser may have a Fresnel number between about 0.5 and 10. Still further embodiments may have a Fresnel number less than about 2. In one particular embodiment, a laser may have a Fresnel number of about 1.394. Within these general ranges of Fresnel number, in an embodiment in which the laser is a carbon dioxide gas laser, having a free space wavelength of approximately 10.59 μm, a laser cavity 14 may have a cross-sectional dimension of 4.5 mm and greater. Furthermore, a laser cavity 14 consistent with the present disclosure may have a D-shaped cross-section, such as depicted in FIGS. 2 through 4. A D-shaped cross-section may provide a relatively round Gaussian mode. The laser cavity may also be provided having various alternative cross-sectional shapes, including but not limited to, round, square, etc. Asymmetric bore cross-sections, such as the illustrated D-shaped bore, may frustrate undesirable higher order modes of pseudo free space laser bores, and may lead to a Gaussian beam profile of greater purity than may typically be achieved with a symmetric bore cross-section. However, acceptable modes may still be achievable using symmetrical bore cross-sections. Such symmetrical bore cross-sections are, therefore, also contemplated within the scope of the present disclosure.

In other embodiments, the laser may be provided having a Fresnel number less than about 0.5. In such an embodiment the laser may behave as a waveguide laser. As discussed in connection with the free space embodiment, the laser bore may have a D-shaped bore. Other symmetrical and asymmetrical bore geometries may also be employed, as discussed.

According to another aspect, an offset V-shape of the laser cavity 14 may allow the cumulative volume of the internal gas reservoirs 16, 18 to be maximized. According to one aspect, the volume of the internal gas reservoirs 16, 18 may be maximized, at least in part, by reducing the number of internal gas reservoir cavities to two. In such an embodiment, volume usage of the ceramic body 12 may be optimized. In various alternative embodiments, a laser consistent with the present disclosure may include one or more internal gas reservoirs. In addition to the number of internal gas reservoirs, the volume of the internal gas reservoirs may be a function of the thickness of the body 12. For example, a thicker body 12 may accommodate larger volume gas reservoirs 16, 18.

The internal gas reservoirs 16, 18 may provide an additional gas volume, beyond the volume of gas in the laser cavity 14. The additional gas volume provided by the internal gas reservoirs 16, 18 may dilute any contaminates and/or undesired gas species that may be generated by the operation of the laser. Additionally, the laser cavity 14 and the internal gas reservoirs 16, 18 may be connected by the gas communication slots 26, 28, 30, 32. The internal gas reservoirs 16, 18 and the interconnection of the internal gas reservoirs 16, 18 and the laser cavity 14 by the gas communication slots 26, 28, 30, 32 may dampen any acoustic resonance in the laser cavity 14 during power pulses. Dampening of acoustic resonance in the laser cavity may prevent and/or reduce optical output variations.

With particular reference to FIGS. 2 through 4, the ceramic body 12 may include electrode slots 42 in the outer surface of the upper body portion 34. The lower body portions 36 may include corresponding electrode slots, e.g., 42 and 44 shown in FIGS. 3 and 4. As shown, the electrode slots 42, 44 may generally correspond to the layout of the laser cavity 14. For example, as shown the slots 42, 44 may generally be arranged in an offset V-shape. Electrodes 46, 48 may be at least partially disposed in the slots 42, 44 for electrically pumping the gain medium, i.e., the gas, within the laser cavity 14, by means of applied RF energy. As shown, the electrode slots 42, 44 may be formed extending partially into the ceramic body 12. A wall of ceramic material 50, 52 may be maintained between the slots 42, 44 and the laser cavity 14. The walls of ceramic material 50, 52 may place the electrodes 46, 48 close enough to pump the gain medium in the laser cavity 14 without compromising the integrity of the ceramic body 12. Additionally, the thin wall of ceramic material 50, 52 may maintain the laser cavity 14 in a sealed condition without the need to establish a gas-tight seal between the electrodes 46, 48 and the ceramic body 12.

According to a further aspect, in addition to electrically pumping the gain medium, the electrodes 46, 48 may also be employed for thermal management. For example, the electrodes may be employed to remove heat from the laser cavity 14. The proximity of the electrodes 46, 48 to the laser cavity 14 may provide lower thermal impedance between the laser cavity 14 and the electrode slots 42, 44 than between the laser cavity 14 and the top and bottom surfaces 35, 37 of the ceramic body 12. The electrodes 46, 48 may be formed of a relatively highly thermally conductive material, such as copper. The exposed outer surfaces 54, 56 of the electrodes 46, 48 may be thermally coupled to a heat spreader, heat sink, or other thermal transfer and/or thermal dissipation device. For example, as shown one or more of the electrodes may be thermally coupled to a heat sink by physical contact between the electrodes 48 and the heat sink 49. A thermal interface material may also be employed to facilitate thermal coupling between the electrodes and the thermal transfer and/or thermal dissipation device.

As shown, in FIG. 3, according to one particular embodiment, the electrodes 46, 48 may extend at least the entire depth of the slots 42, 44, e.g., the electrodes 46, 48 may extend to be at least flush with the top and bottom surfaces 35, 37 of the ceramic body 12. In such an embodiment, the electrodes may contact a thermal transfer and/or thermal dissipation device in the plane of the top and bottom surfaces 35, 37 of the ceramic body. For example, the ceramic body 12 may be disposed on a heat sink 49. One or more of the electrodes 46, 48 extending to the top and bottom surfaces 35, 37 of the ceramic body 12 may similarly contact the heat sink 49, thereby facilitating heat transfer from the electrodes 46, 48 to the heat sink 49. Other related configurations are also contemplated.

In alternative embodiments, the electrodes may be at least slightly recessed relative to the top and bottom surfaces of the ceramic body. In such an embodiment, the heat sink may include protrusions, such as ribs, bosses, etc., which may be at least partially received in the electrode slots to contact the electrodes. In a related embodiment, at least a portion of the electrodes may protrude beyond the top and bottom surfaces of the ceramic body. The protrusion of the electrodes beyond the top and bottom surfaces of the ceramic body may provide an airspace between the ceramic body and the heat sink while still thermally coupling the electrodes to the heat sink. In another embodiment, the protruding portions of the electrodes may be at least partially received in cooperating recesses in thermal dissipating and/or thermal transfer device. Furthermore, the electrodes may be provided with features to facilitate heat transfer. For example, a heat pipe may be at least partially embedded in one or both of the electrodes to facilitate heat transfer from the electrode.

Turning to FIG. 4, in one embodiment the electrodes 46a, 48a may be configured to provide a passage 58, 60 for a fluid heat transfer medium. As shown, the electrode may be provided as a layer, e.g., of copper or other suitable electrically and thermally conductive material, disposed along at least a portion of the bottom of the electrode slots 42, 44. As shown, the electrode may additionally cover at least a portion of one or both side walls of the electrode slots 42, 44. The electrode slots 42, 44 may include a top member 62, 64 covering the electrode slots 42, 44 to define the passages 58, 60. The top members 62, 64 may include electrically conductive members and/or include electrically conductive features. In such an embodiment, the top members 62, 64 may be electrically coupled to the electrodes 46a, 48a. The top members 62, 64 may, in effect, be part of the electrode system.

Each passage 58, 60 may include an inlet 66, 68 and a corresponding outlet (not shown). A fluid heat transfer medium may be introduced into each passage 58, 60 via the inlets 66, 68. The fluid heat transfer medium may flow through the passages 58, 60 and exit through the outlets. As the fluid heat transfer medium passes through the passages 58, 60, heat may be transferred from the electrodes 46a, 48a to the fluid heat transfer medium and removed through the outlet. The fluid heat transfer medium may be thermally conditioned, e.g., via a heat exchanger or chiller and re-circulated through the passages 58, 60. Alternatively, the fluid heat transfer medium may be disposed of after exiting the outlet.

Various fluid heat transfer media may be used in connection with the foregoing embodiment of a laser consistent with the present disclosure. According to one embodiment, the fluid heat transfer medium may be a gas, such as compressed air. The gaseous heat transfer medium may be disposed of, e.g., by venting into the atmosphere, after exiting through the outlet. Liquid heat transfer media may also suitably be employed. According to one embodiment the liquid heat transfer media may include an oil based coolant, and/or other non-electrically conductive coolant. Advantageously, such non-electrically conductive coolants may not influence the RF impedance of the circuit, and/or such influence may be determined and compensated. Electrically conductive coolants, for example water, may, however, also provide suitable heat transfer media in connection with the present disclosure. For example, electrically conductive coolants may be employed if the coolant is introduced in a manner to avoid shorting the RF circuit.

According to a further embodiment, the electrodes may include one or more fins extending into the passages. The fins may facilitate heat transfer from the laser cavity to the fluid heat transfer medium, e.g., by increasing the surface area for heat transfer. In a related embodiment, the electrodes may include one or more partitions, providing two or more passages associated with each electrode. The two or more passages may facilitate circuiting the fluid heat transfer medium.

The electrodes 46, 48, 46a, 48a may be provided from any suitable electrically conductive material. Consistent with an embodiment in which the electrodes may assist in thermal management, the electrodes may further be a material having a relatively high thermal conductivity. According to one embodiment, the electrodes may be copper or a copper alloy. Various other suitable materials, such as silver, aluminum, etc., may also suitably be employed. In the case of a solid electrode 46, 48 at least partially disposed in the electrode slots 42, 44, the electrode may be pressed and/or swaged into the electrode slots 42, 44. The electrodes 46a, 48a disposed at least partially on a floor and a wall of the electrode slots 42, 44 may be provided by plating one or more of the surfaces of the electrode slots 42, 44 with a metal, e.g., copper, to provide the electrode 46a, 48a. In a further embodiment the electrodes 46, 48, 48a, 48a may be bonded in the electrode slots 42, 44. In one embodiment, the electrodes 46, 48, 46a, 48a may be bonded in the electrode slots 42, 44 using an electrically conductive epoxy. According to various other embodiments, other electrically conductive and non-electrically conductive adhesives may also be employed for bonding the electrodes in the electrode slots, such as epoxy, polyurethane adhesive, acrylic based adhesives, etc. Similarly, tape products, including electrically conductive tapes, may be employed. Advantageously, the RF characteristics of the adhesive, etc., may be considered during selection of the adhesive.

As mentioned, the internal gas reservoirs 16, 18 and the gas communication slots 26, 28, 30, 32 may provide an additional volume of gas, which may dilute any contaminants and/or undesired gas species generated during the operation of the laser. The gas communication slots 26, 28, 30, 32 may ensure good gas communication between the internal gas reservoirs 16, 18 and the laser cavity 14. Furthermore, the reservoirs 16, 18 may be connected by the gas communication slots 26, 28, 30, 32 in a way to dampen any acoustic resonance that may occur in the laser cavity 14 as laser input power is pulsed. According to another aspect, the gas communication slots 26, 28, 39, 32 may assist in lighting the laser 10.

As shown, for example, in FIG. 3, the electrodes 46, 48 may extend laterally at least partially beyond the laser cavity 14. That is, one or both of the electrodes 46, 48 may be at least partially wider than the laser cavity 14 for at least a portion of the length of the laser cavity 14. In such an arrangement, the electrodes 46, 48 may extend over at least a portion of one or more of the gas communication slots 26, 28, 30, 32. When the electrodes 46, 48 are energized to pump the gain medium, the volume of gas in the gas communication slots 26, 28, 30, 32 bounded by the electrodes 46, 48 may become excited. As shown, a gas communication slot, such as the centrally located slot 30, may be provided having a height that is less than the height of the laser cavity 14. For example, gas communication slot may have a height that is between about 75% to about 25% the height of the laser cavity. In a particular embodiment, a gas communication slot, e.g., 30, may have a height that is approximately one half the height of the laser cavity 14. The smaller height of the gas communication slot 30 may allow the gas in the gas communication slot 30 to light more quickly than the gas in the laser cavity 14. The excitation of the gain medium in the gas communication slot 30 may quickly spread to the laser cavity 14. In this manner, the excitation of the gas in the gas communication slot 30 may make the laser very easy to light.

With particular reference to FIGS. 1 and 2, a number of optical components may be utilized to define the resonator. In the illustrated embodiment mirrors 20, 22, 24 may be coupled to the ceramic body 12 to define the resonator. The mirrors 20, 22, 24 may be coupled to the ceramic body 12 at mounting surfaces 40, 41, 43 of the ceramic body 12. As shown, at least one of the mirrors 20 may be directly coupled to the ceramic body at the respective mounting surface 40. Furthermore, at least one of the mirrors 22, 24 may be coupled to the ceramic body 12 through a mounting fixture, such as an adjustable mirror mount in the depicted embodiment, at the respective mounting surfaces 41, 43. In still further embodiments, all of the mirrors may be directly couple to the ceramic body or all of the mirrors may be coupled to the ceramic body via fixtures.

According to one aspect, the surfaces 40, 41, 43 may be prepared to accept the mirrors 20, 22, 24 either directly or mounted by a fixture. As shown in FIGS. 1 and 2, the surfaces 40, 41, 43 may be counter bored 70, 72, 73 to accept the optical components, i.e., either the mirror directly or mounted by a fixture. The counter bores 70, 72, 73 may provide a relief between the mirror surface and the laser cavity 14. The relief between the mirror surface and the laser cavity 14, may lower the probability of the mirror 20, 22, 24 becoming damaged by particles which may be shaken to the mirror 20, 22, 24. Additionally, the counter bore 70, 72, 73 may provide some degree of mode control. In some embodiments, the relief between the mirror 20, 22, 24 and the laser cavity 14 provided by the counter bore 70, 72, 73 may reduce and/or prevent the occurrence of RF discharge across the mirror assemblies. While each of the mirrors 20, 22, 24 have been shown coupled directly to the ceramic over the respective counter bore, it should be appreciated that one or more of the mirrors may be coupled to the ceramic body either directly or through a fixture, e.g., adjustable or non-adjustable mirror mount, without the use of a counter bore.

Various components may be in gas communication with, and/or otherwise provide an opening in communication with, the interior of the ceramic body 12, i.e., the internal gas reservoirs, the laser cavity, the gas communication slots, etc. For example, the mirrors 20, 22, 24 may be provided at openings between the laser cavity 14 and the exterior of the ceramic body 12. Similarly, an opening 74 may be provided in gas communication with one of the internal gas reservoirs 18, e.g., to accommodate a valve. A gas tight seal may be provided at each opening providing gas communication between the interior of the ceramic body and the exterior of the laser 10. In one embodiment, one or more of the components in an opening in communication with the interior of the ceramic body 12 may be secured to the ceramic body 12 and sealed using an adhesive. One particular adhesive may be an epoxy. Desirably the epoxy may be a low out-gassing epoxy. A low out-gassing epoxy may generate little or no by products which may dilute and/or contaminate the gain medium. Additionally, an epoxy may provide a relatively high service temperature, i.e., may experience little or no degradation at the laser operating temperatures. An epoxy herein may also provide a relatively low affinity for water and may permit the bonding of materials having varying thermal expansions.

An adhesive, such as a low out-gassing epoxy, may allow facile assembly of the laser 10. The epoxy may be applied to one or both of the mating surfaces, e.g., a valve and an associated opening, and cured to provide a gas tight seal between component and the ceramic body. In related embodiments, the component may be fitted to the ceramic body and the epoxy may be applied between the mating surfaces, e.g., by localized injection. Consistent with such embodiments, adhesive bonding may provide an appropriate gas-tight seal while allowing easier and cleaner assembly, as compared to, e.g., brazing or welding. Various curing schemes may be employed depending upon the adhesive, the particular application, etc. For example, the adhesive may be a room temperature curing adhesive, or may cure at an elevated temperature or upon exposure to UV, etc. The use of an adhesive for coupling components to the ceramic body and/or for providing gas-tight seals may also prevent and/or reduce the introduction of mechanical and/or thermal stresses to the ceramic body and/or components attached thereto, as may be experienced with press fit, brazed, and/or welded connection. Notwithstanding the foregoing, the present disclosure contemplates the use of welding, brazing, fritting, etc., for sealing and/or attaching one or more components and/or features to the ceramic body.

In addition to allowing relatively easy and clean assembly of components to the ceramic body, while still maintaining a desired gas-tight seal, the use of an adhesive may permit the recovery of expensive components. For example, in the event of a failure or defect of a component it may be possible to salvage at least a portion of the remaining components. For example, in the event of the failure or damage of a mirror it may be possible to extract the damaged mirror and rebuild the laser. Alternatively, expensive components such as the ceramic body may be salvaged by removing the remaining components. It may be possible to clean and/or otherwise restore the ceramic body and build a new laser utilizing the salvaged ceramic body. The use of an adhesive may permit the components to be removed from the ceramic body without damage to the ceramic body. Furthermore, it may be possible to clean and/or otherwise remove residual adhesive from the ceramic body, e.g., by firing, grinding, etc., without damaging the ceramic body.

Figure 5:
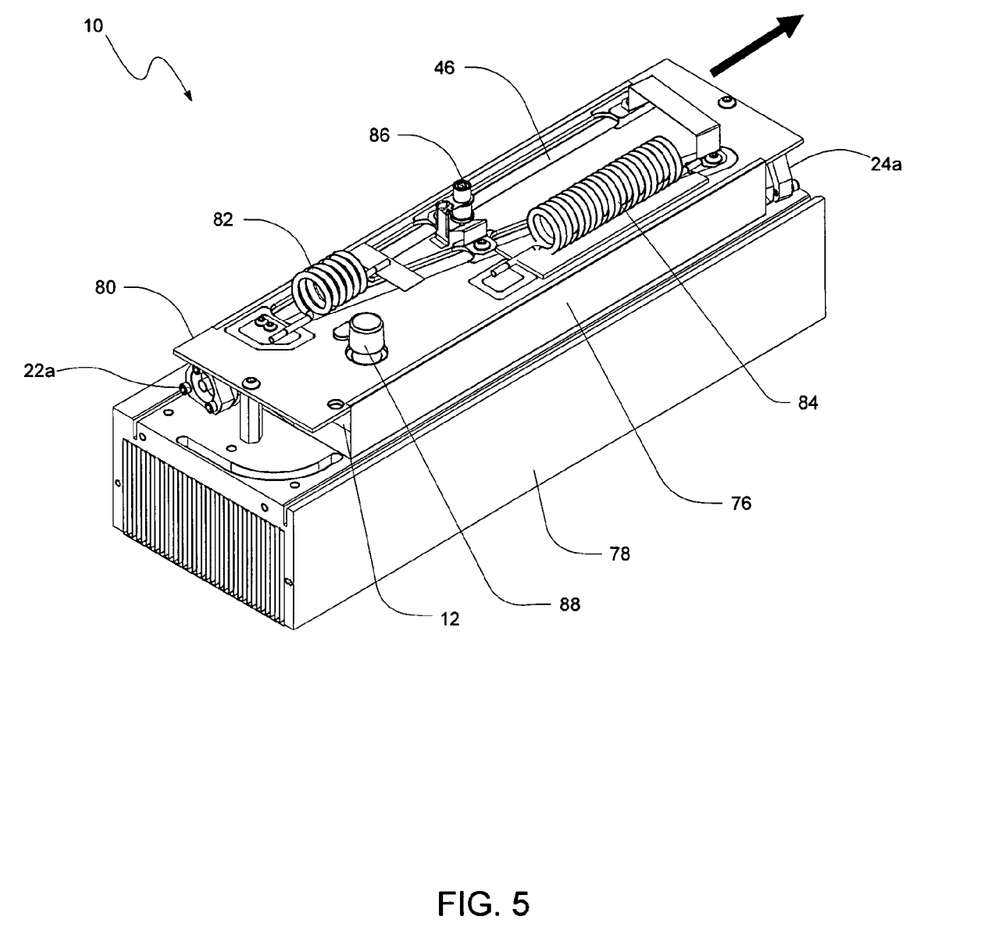
FIG. 5 is a perspective view of an embodiment of a complete laser consistent with the present disclosure.
Figure 6:
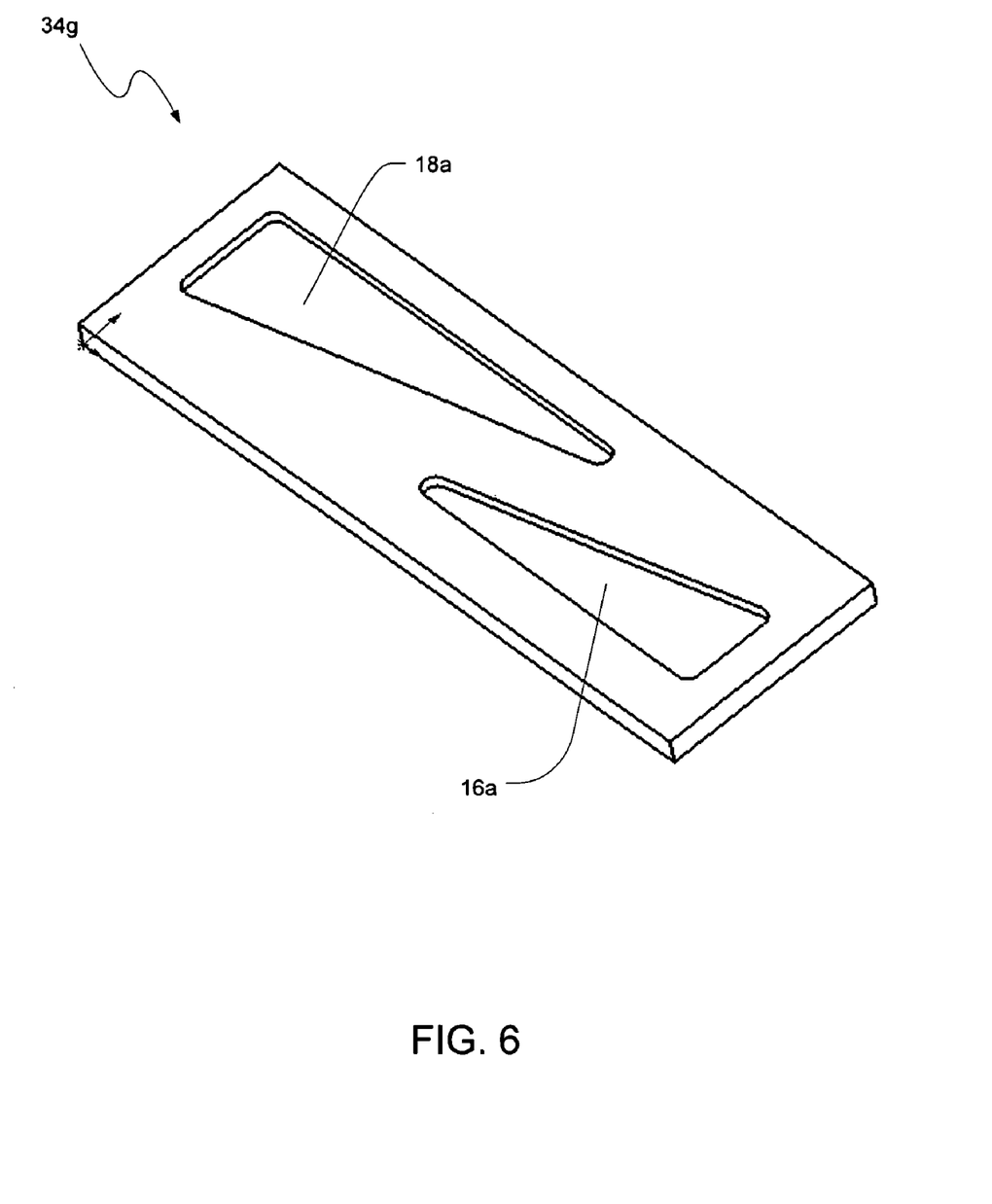
FIG. 6 is a perspective view of an embodiment of a green upper body component.
Figure 7:
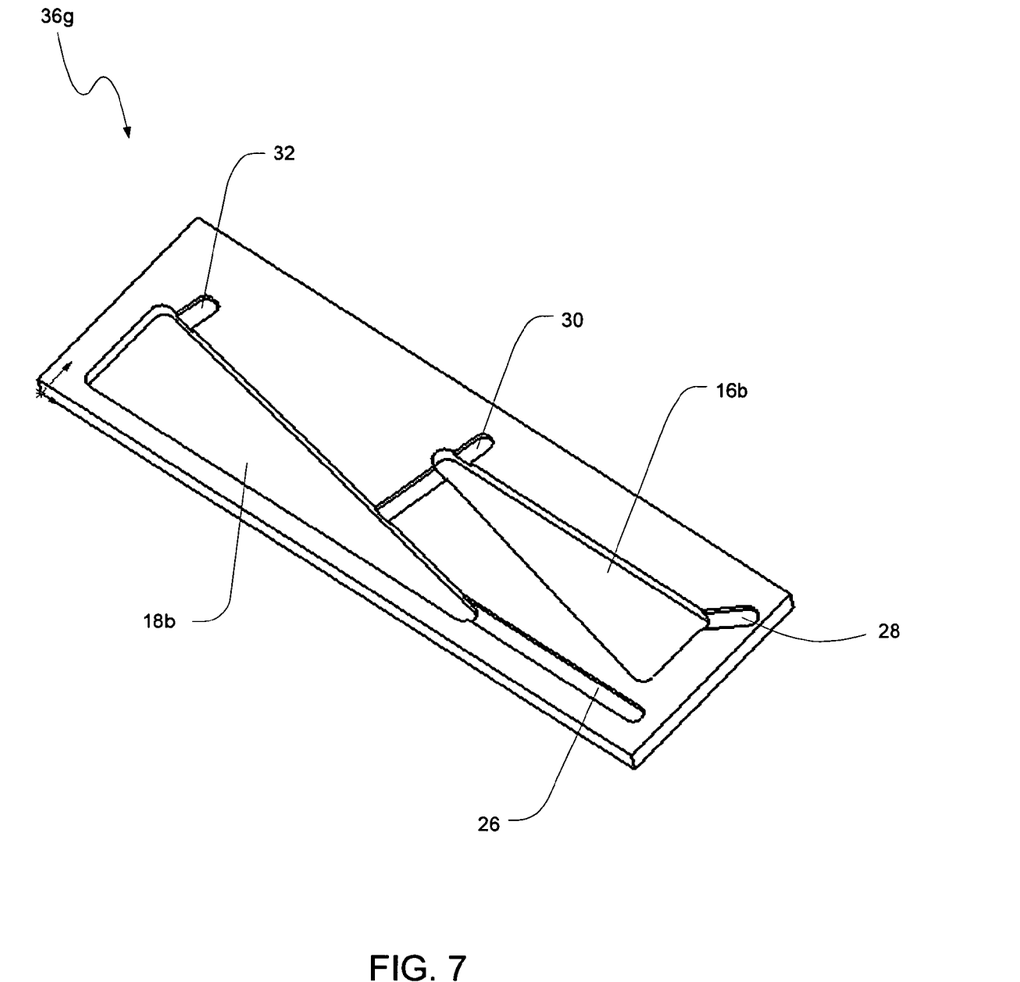
FIG. 7 is a perspective view of an embodiment of a green lower body component.

Turning to FIG. 5, an embodiment of a laser 10 consistent with the present disclosure is shown. The laser 10 may include the ceramic body 12 at least partially disposed in a copper jacket 76. The ceramic body 12 and/or the copper jacket 76 may be mounted to a heat sink 78. As described previously, an electrode may be thermally coupled to the heat sink to assist in thermal management of the laser. A printed circuit board (PCB) 80 may be mounted to an external electrode 46. The PCB 80 may include the various coils, e.g., a resonator coil 82 and a matching coil 84, capacitors, e.g., tuning capacitor 86, etc. needed to complete the RF circuit for the laser 10. Additional RF shielding and protective housing may also be included, though are not shown.

Electrodes 46, 48 disposed external to the vacuum envelope of the laser 10 may allow a less complex and less expensive RF circuit to be used. For example, RF feed-throughs may be eliminated. Furthermore, resonant matching to the RF power amplifier may be achieved by the external resonant coil 82, etc.

As shown in FIG. 5, the mirrors, e.g., in mirror assemblies 22a, 24a, may be coupled to the ceramic body via mirror mounts. In an embodiment, the mirror mounts may be adjustable, allowing the angle of the mirror to be changed. The mirror mount may include one or more thin webs of material. The webs of material may be deformed to achieve changes in the angle of the mirror supported in the mount. The mirror mount may, accordingly, be formed from a plastically deformable material, e.g., a metallic material. In one embodiment, the mirror mount may be formed from 17-4PH stainless steel. In a particular embodiment, the 17-4PH stainless steel may be heat treated at 480 degrees C. for an hour and cooled in air. The thermal expansion of 17-4PH stainless steel may generally match that of alumina ceramic, i.e., to a sufficient degree which may minimize the introduction of stresses over temperature. The hardness and tensile strength of the 17-4PH stainless steel may promote stable adjustment of the mirrors. Additionally, the heat treating of the stainless steel may oxygen passivate the material, leaving it with little or no affinity for oxygen or any of the active species of oxygen. Various other metallic and non-metallic materials may also suitably be employed for producing adjustable mirror mounts herein.

Referring to FIGS. 6 through 9, a ceramic body for a laser core may generally be formed from an upper and lower body portions. As shown, green ceramic body portions 34g, 36g, i.e., unfired ceramic body portions, may be relatively easily machined to provide desired features. For example, cavities 16a, 18a may be machined in the green upper body portion 34g may be machined to corresponding to internal gas reservoirs. Similarly, cooperating cavities 16b, 18b may be machined in the lower body portion 36g to provide corresponding portions of the internal gas reservoirs. Additionally, gas communication slots 26, 28, 30, 32 may be machined in the green lower body portion 36g.

Green machining the cooperating cavities 16a, 16b and 18a, 18b as well as the gas communication slots 26, 28, 30, 32 may minimize grinding after the body portions have been fired, which may be a more costly and time consuming diamond grinding process. The cooperating cavities 16a, 16b, 18a, 18b and the gas communication slots 26, 28, 30, 32 may not require high accuracy, and therefore any dimensional variances which may occur during firing, and after the subsequent expected shrinkage may not effect the performance of the laser. Additionally, and/or alternatively, any green machined features may undergo final grinding to achieve desired tolerances after firing.

Figure 8:
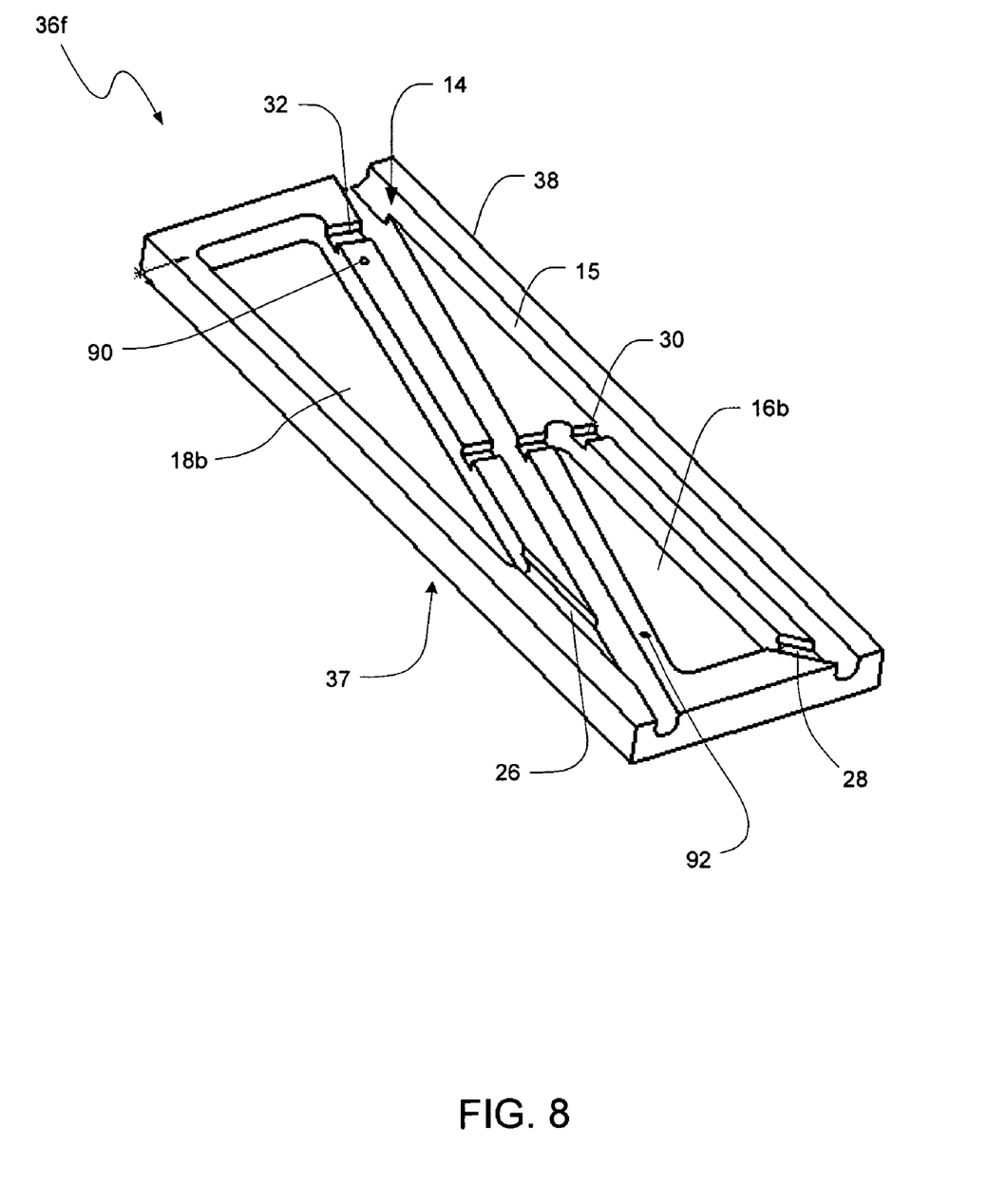
FIG. 8 is a perspective view of a lower body component after grinding.
Figure 9:
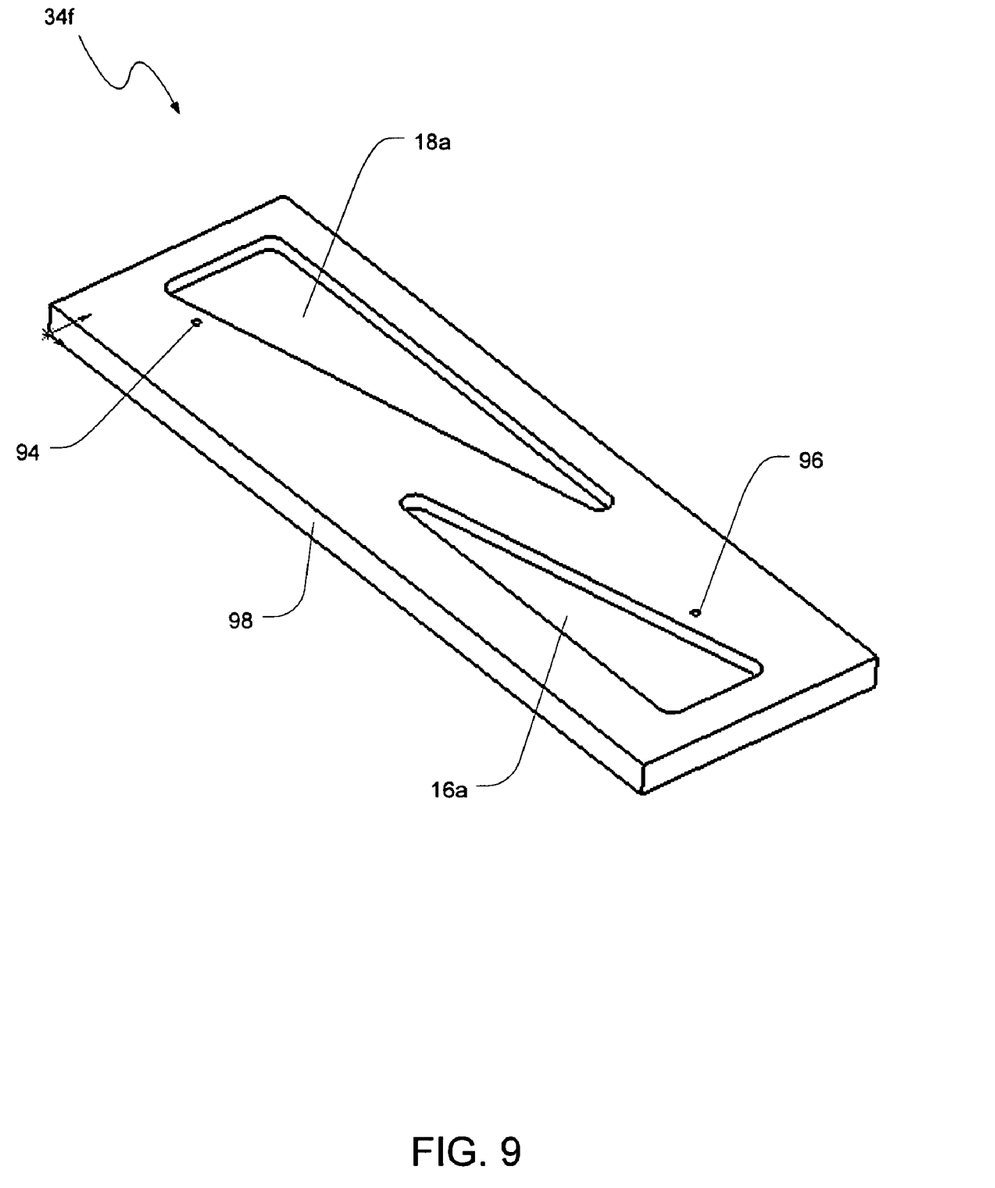
FIG. 9 is a perspective view of an upper body component after grinding.

Once the various features have been machined into the green body portions 34g, 36g, the green ceramic body portions 34g, 36g may be fired, providing fired upper and lower body portions 34f, 36f. The fired upper and lower body portions 34f, 36f may be ground to provide flat mating surfaces. The upper and lower body portions 34f, 36f may be drilled to provide locating holes 90, 92, 94, 96. The locating holes 90, 92, 94, 96 may allow the upper and lower body portions 34f, 36f to be indexed relative to one another for assembly, etc.

The laser cavity 14 may be ground into the lower body portion 36f. In an embodiment, a D-shaped laser cavity 14 may be ground into the lower body portion 36f and oriented so that the first optical path is parallel to the near side 38 of the lower body portion 36f. For example, the D-shaped laser cavity 14 may be ground using the near side 38 of the lower body portion 36f as a reference and/or guide surface. The side 38 of the lower body portion 36f may, therefore, provide a reference surface parallel to the first optical path 15, e.g., for subsequently aligning features relative to the first optical path 15. Furthermore, the body portions 34f, 36f may be dimensioned such that the side 38 of the lower body portion 36f is wider than the corresponding side 98 of the top body portion 34f. For example, the side 38 of the lower body portion 36f may be dimensioned to be five thousandths of an inch wider than the top body portion 34f, or any other suitable dimension. The side 38 and the bottom surface 37 of the lower body portion 36f may, in such an embodiment, provide reference surfaces relative to the first optical path 15 of the laser cavity 14.

Once the internal features have been formed in the respective body portions 34f, 36f, the upper and lower body portions 34f, 36f may be joined together. As mentioned, the upper and lower body portions 34f, 36f may sealed together using glass fritting material, which may prevent leakage even under high vacuum. The fritting material may be provided as a glass loaded tape with may be trimmed to a desired size and applied to the upper or the lower body portions 34f, 36f. The body portions 34f, 36f may be assembled with the glass frit therebetween. The body portions 34f, 36f may be registered relative to one another via locating pins disposed in locating holes 90, 92, 94, 96.

The assembled body portions 34f, 36f and glass fritting material may be fired at least partially melt the glass fritting and seal the body portions 34f,36f together. To facilitate joining the body portions 34f, 36f, the body portions 34f, 36f may be pressed together during firing, e.g., by stacking the body portions 34f, 36f and a weight to apply a compressive pressure. The temperature of the firing process may be adjusted to control the viscosity of the glass fritting, e.g., to control the flow of the glass. In addition to at least partially melting the glass fritting, the firing operation may burn off any binders, water, etc. in the glass fritting material.

In one embodiment, it may not be necessary to provide any special surface treatment, beyond grinding the surfaces flat, to achieve desired sealing between the upper and lower body portions 34f, 36f. Additionally, in an embodiment in which the laser cavity 14 is a free space laser cavity, there may be little or no interaction between the light beam and the walls of the laser cavity. Therefore the presence of a small amount of glass fritting, e.g., resulting from glass fritting running or discharging into the laser cavity 14, may be tolerated without significantly harming the performance of the laser.

In various other embodiments, operations other fritting may be used to join the body components together. Exemplary sealing operations may include diffusion bonding, adhesive bonding, etc. Consistent with such embodiments, the body components may be bonded together to provide a vacuum tight seal.

With the upper and lower body portions 34f, 36f sealed together, the faces 40, 41, 43 for the mirrors 20, 22, 24 may be prepared. The first face 40 for the output coupler may be ground at the desired angle relative to the laser cavity 14 and to the desired accuracy by reference to the edge 38 and bottom surface 37 of the bottom body portion 36f. Similarly, the other faces 41, 43 for the remaining mirrors 22, 24 may be ground at the respectively desired angles to the laser cavity by reference to the edge 38 and bottom surface 37 of the bottom body portion 36f. Alternatively, the remaining faces 41, 43 may be ground by reference to the first face 40. In related embodiments, the faces 40, 41, 43 may be ground in any desired order and with various reference to the edge 38 and bottom surface 37 of the bottom body portion 36f and to any of the other faces 40, 41, 43. In addition to being oriented at a desired angle, the fold mirror 22 may be positioned at a desired depth, e.g., at the plane of the optical intersection of the first and second optical paths 15, 17.

In surface grinding the faces 40, 41, 43 it may be desirable to achieve a smooth surface finish. For example, one or more of the mirrors 20, 22, 24 may be coupled to the ceramic body 12 via an adhesive, such as epoxy. The bond strength and the stability of the mirror may be affected by the surface quality of the respective face 40, 41, 43. Grinding parameters, such as run out, may influence the surface finish achieved. Accordingly, the grinding wheel may be dressed to minimize and/or eliminate run out, which may result in a rippled surface finish of the faces 40, 41, 43.

In addition to providing the faces 40, 41, 43 at the desired angle and having a desired surface finish, the faces 40, 41, 43 may be smooth across the seam between the upper and lower body portions 34f, 36f. Smoothness across the seam may be a function of both the sealing of the body portions 34f, 36f and the grinding operation. For example, in an embodiment having a relatively thick seam between the body portions, insufficient glass fritting may leave a hollow, or concavity, between the upper and lower body portions along at least a portion of the seam. Such a hollow may allow leakage under parts bonded across the seam. Controlling the glass fritting process, e.g., the amount of glass frit, the firing temperature, the compressive pressure, etc., may reduce and/or eliminate hollows along the seam between the upper and lower body portions. Additionally, minor hollows may be eliminated by grinding the face to remove the concavity at the seam. Similarly, an overfilled seam having a protruding bead may be ground to provide a flat face across the seam.

Once the faces 40, 41, 43 have been prepared, counter bores 70, 72, 73 may be created for at least partially receiving the mirrors 20, 22, 24 either directly or including mirror mounts. Similarly, a stepped opening 74 in communication with one of the internal gas reservoirs 16, 18 may be formed in the upper or lower body portion 34f, 36f. The mirrors 20, 22, 24 and a valve 88 may be installed in the respective openings. In one embodiment, the mirrors and the valve may be adhesively bonded in the respective openings, e.g., using an epoxy. The adhesive bond may provide a clean installation and a gas-tight seal. The gas tight seal provided at each opening of the ceramic body 12, along with the gas tight seal between the two body portions 34, 36 achieved via fritting, may provide a gas tight structure. Such a gas tight structure may eliminate the need for a metal enclosure to provide the necessary vacuum integrity. Additionally, the ceramic body 12 may, itself, support the mirrors, either directly or via mount features.

Any water that becomes trapped in the laser cavity, internal gas reservoirs, gas communication slots, etc., may reduce the power output of the laser over time. In an embodiment, prior to assembly, the various components, e.g., mirrors, valve, ceramic body, etc., may be fired to clean the components and to drive off any water. Additionally, water within the laser cavity and/or the internal gas reservoirs and gas communication slots may be controlled using water getters. For example a desiccant may be provided in gas communication with the laser cavity. In one particular embodiment, a bead of zeolite, e.g., a 3 mm bead, may be installed as part of the valve assembly. For example, the bead of zeolite may be attached or bonded to the valve assembly, or otherwise coupled to the valve assembly, which may be installed in communication with an internal gas reservoir.

According to another embodiment, the laser body may be formed from more than two body components. For example, the laser body may be formed from three or more ceramic layers which may be stacked together in a laminate structure defining the laser cavity. For example, the individual layers may include respective cutouts defining an internal and/or an external geometry of the laser body at the given layer height. The layers may be bonded together, e.g., via fritting, diffusion bonding, adhesive, etc. to provided the laser cavity. Various other embodiments utilizing more than two body components may also be provided consistent with the present disclosure.

Figure 10:
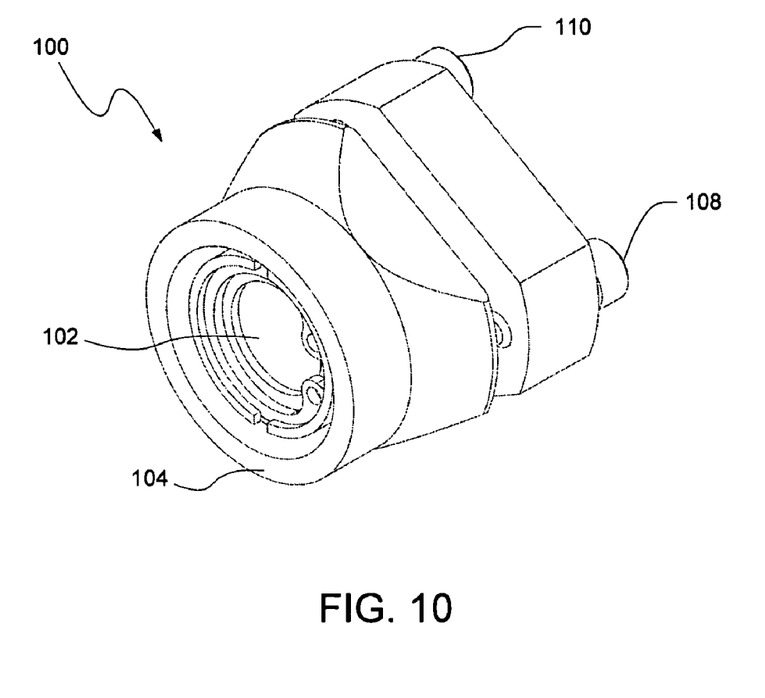
FIG. 10 is a perspective view of an embodiment of a mirror mount consistent with the present disclosure.
Figure 11:
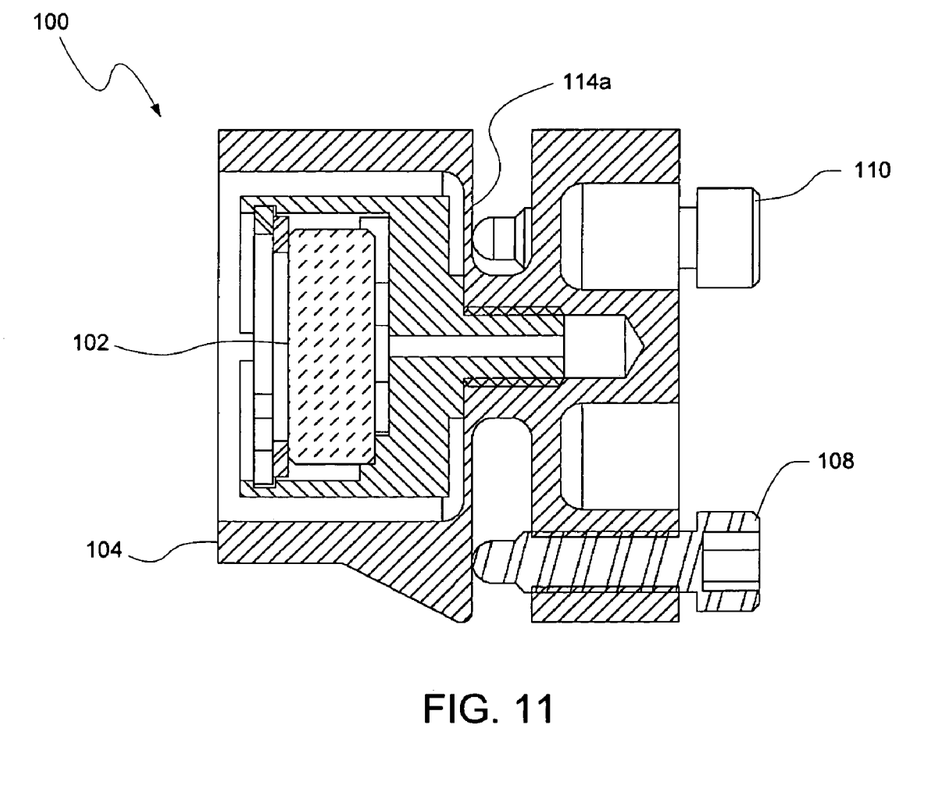
FIG. 11 is a cross-sectional view of the embodiment of a mirror mount depicted in FIG. 10.

Referring to FIGS. 10 and 11, an embodiment of an adjustable mirror mount 100 consistent with one aspect of the present disclosure is shown. A mirror 102 may be supported within the mirror mount 100. The mirror mount 100 may further include a mounting surface 104. The mirror mount 100 may be coupled to a laser, e.g., may be coupled to ceramic laser body, such as described herein above, at the mounting surface 104 of the mirror mount 100. For example, the mirror mount 100 may be adhesively bonded, brazed, welded, and/or otherwise coupled to the laser. In one such embodiment, the mirror mount 100 may be coupled to a laser, e.g., via an epoxy, to provide a gas tight seal at an opening in the laser.

According to one aspect, the angle of the mirror 102 may be adjusted relative to a mounting surface 104 of the mirror mount 100. Accordingly, the angle of the mirror 102 relative to, for example, a laser beam emitted by a laser, may be adjusted. As shown, the mirror mount 100 may include one or more deformable webs of material 114a. The webs of material 114a may be acted on by adjustment screws 108, 110, or similar adjustment features. The adjustment screws 108, 110 may deform the webs of material 114a to effect a change in the angle of the mirror 102 supported in the mirror mount 100.

In an embodiment of an adjustable mirror mount 100 including deformable webs of material 114a for adjusting the angle of a mirror 102 supported therein, the mirror mount 100 may include a plastically and/or elastically deformable material. One suitable plastically deformable material may include a metallic material. In one embodiment, the mirror mount 100 may be formed from 17-4PH stainless steel. The thermal expansion of the 17-4PH stainless steel may generally match that of alumina ceramic, for example, to a sufficient degree which may minimize the introduction of stresses over an operating temperature range of the laser.

Furthermore, the hardness and tensile strength of the 17-4PH stainless steel may promote stable adjustment of the mirror 102 supported in the mirror mount 100. In a particular embodiment, the 17-4PH stainless steel may be heat treated at about 480 degrees C. for an hour and cooled in air. Heat treating the stainless steel, in addition to conditioning the mechanical properties thereof, may oxygen passivate the material, leaving it with little or no affinity for oxygen or any of the active species of oxygen, e.g., which may be generated during the operation of the laser. While 17-4PH stainless steel has been disclosed as one suitable material, a mirror mount consistent with the present disclosure may be produced from various other metallic and/or non-metallic materials.

The metallic components, such as mirror mounts, the valve assembly, etc., may be passivated prior to installation. Passivation may form a protective patina on the metallic components which may protect the components from further reaction with oxygen or active species of oxygen. Additionally, passivation may heat treat the metallic components and may burn off, or otherwise remove, organic contaminants and water which may be present on the metallic components. In some embodiments, passivation may also provide a better surface for adhesive bonding, as to the ceramic body or other components.

The present disclosure has made reference to various embodiments consistent with the present invention. It should be understood that the various features, aspects, and advantages of the several embodiments may be combined with one another. Similarly, the embodiments described herein are susceptible to variation and modification without materially departing from the sprit of the present invention. Accordingly, present invention should not be limited by any of the disclosed embodiments, and should be given the full breadth of the claims appended hereto.

What is claimed is:

1. An RF excited carbon dioxide laser comprising:
   a vacuum tight ceramic body;
   an offset V laser cavity defined at least partially within said body, said offset V laser cavity being defined by a first optical path arranged generally parallel to one side of said body and a second path extending at an angle to the first optical path, said laser cavity having a Fresnel number greater than about 0.5;
   at least one internal gas reservoir defined at least partially within said body and in gas communication with said laser cavity via at least one gas communication slot extending therebetween;
   a first slot in said body at least partially receiving a first electrode; and
   a second slot in said body at least partially receiving a second electrode.

2. An RF laser according to claim 1, wherein said laser cavity has a Fresnel number between about 0.5 and 2.

3. An RF laser according to claim 1, wherein said laser cavity comprises a generally D-shaped bore.

4. An RE laser according to claim 1, wherein at least one of said first and second electrodes is thermally coupled to thermal transfer or thermal dissipation device.

5. An RF laser according to claim 1, wherein at least one of said first and second electrodes define at least a portion of a passage for a fluid heat transfer medium.

6. An RF laser according to claim 1, comprising at least three gas communication slots providing gas communication between said at least one gas reservoir and said laser cavity.

7. An RF laser according to claim 1, wherein at least one of said first and second electrodes are coupled to said ceramic body by an electrically conductive epoxy.

8. An RF laser according to claim 1, wherein said body comprises at least a first and a second body component.

9. An RF laser according to claim 1, further comprising at least one mirror directly coupled to said body.

10. An RF laser according to claim 1, further comprising a mirror coupled to said body, said mirror at least partially overlying a counter bore formed in said body.

11. An RF laser according to claim 1, comprising two internal gas reservoirs.

12. An RF laser according to claim 1, comprising a PCB coupled to at least one of said first and second electrodes, said PCB supporting components of an electrical RF circuit for energizing said laser.

13. An RF laser according to claim 1, wherein said at least one gas communication slot has a depth less than said laser cavity, and said first and second electrodes overlie at least a portion of said communication slot.

14. An RF laser according to claim 13, wherein said at least one gas communication slot has a depth of about one half the depth of said laser cavity.

15. An RF laser comprising:
    body comprising a laser cavity at least partially defined in said body, said laser cavity being an offset V laser cavity being defined by a first optical path arranged generally parallel to one side of said body and a second path extending at an angle to the first optical path
    at least one internal gas reservoir at least partially defined in said body and in gas communication with said laser cavity; and
    at least one electrode at least partially disposed in said body relative to said laser cavity, said at least one electrode comprising a surface thermally coupled to a heat transfer medium.

16. An RF laser according to claim 15, wherein said electrode at least partially defines a passage and said heat transfer medium comprises a fluid heat transfer medium flowing through at least a portion of said passage.

17. An RF laser according to claim 15, wherein said electrode is at least partially disposed in a slot in said body, and said electrode overlies at least a portion of a bottom and a side of said slot.

18. An RF laser according to claim 15, wherein said heat transfer medium comprises a heat sink or a heat spreader.

19. An RF laser according to claim 15, wherein said laser cavity comprises a V-shaped configuration.

20. An RF laser according to claim 19, wherein said laser cavity comprises an offset V-shaped configuration.

21. An RF excited carbon dioxide laser comprising: a vacuum tight ceramic body;
    an offset V laser cavity defined at least partially within said body, said offset V laser cavity being defined by a first optical path arranged generally parallel to one side of said body and a second path extending at an angle to the first optical path, said laser cavity having a Fresnel number less than about 0.5;
    at least one internal gas reservoir defined at least partially within said body and in gas communication with said laser cavity via at least one gas communication slot extending therebetween;
    a first slot in said body at least partially receiving a first electrode; and
    a second slot in said body at least partially receiving a second electrode.

* * * * *